J. A. HOLMES.
REMOVABLE HOPPER FOR DOUGH PRESSING MACHINES.
APPLICATION FILED MAY 5, 1910.
997,554.
Patented July 11, 1911.
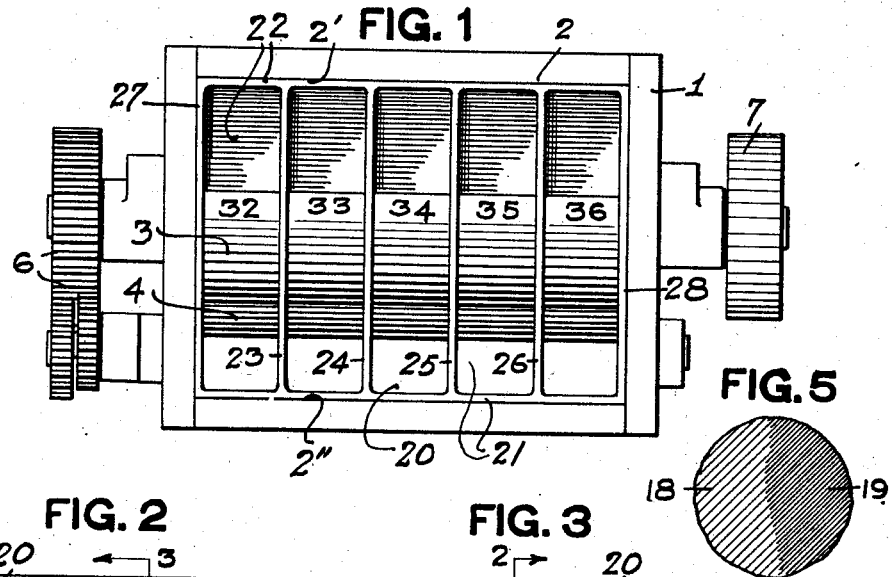
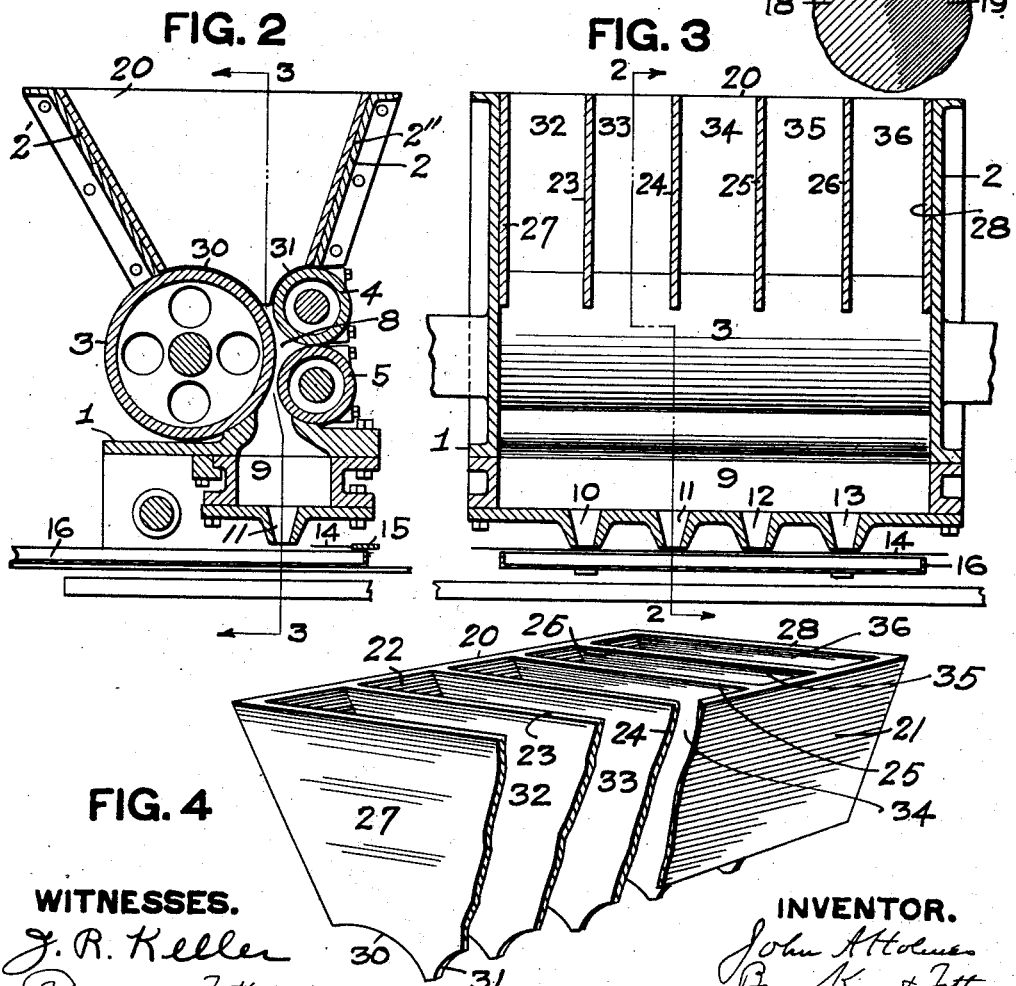
WITNESSES.
J. R. Keller
Robert C. Totten
INVENTOR.
John A. Holmes
By Kay & Totten
Attorneys

UNITED STATES PATENT OFFICE.

JOHN A. HOLMES, OF PITTSBURG, PENNSYLVANIA, ASSIGNOR TO WARD-MACKEY CO., OF PITTSBURG, PENNSYLVANIA, A CORPORATION OF PENNSYLVANIA.

REMOVABLE HOPPER FOR DOUGH-PRESSING MACHINES.

997,554.  Specification of Letters Patent.  Patented July 11, 1911.

Application filed May 5, 1910. Serial No. 559,503.

*To all whom it may concern:*

Be it known that I, JOHN A. HOLMES, a resident of Pittsburg, in the county of Allegheny and State of Pennsylvania, have invented a new and useful Improvement in Removable Hoppers for Dough-Pressing Machines; and I do hereby declare the following to be a full, clear, and exact description thereof.

My invention relates to dough working and cake making machinery. Its object is to facilitate the use of such machines, and especially to provide convenient and practical means for producing cakes or biscuits composed of two or more kinds of material or dough.

My invention is especially adapted for use in connection with machines of this character having a fixed hopper adapted to receive the dough material and feed it to a set of reducing or compressing rolls which deliver it to a chamber opening into a set of nozzles or dies from which the material is delivered in strands or drops. It is particularly adapted for use with a machine of the character described in U. S. Letters Patent No. 549,719, to P. D. Harton, but it is also applicable to other types of machine in which it is desired to mix cake or cracker materials of different characters and deliver them in the form of cakes comprising two or more of such materials.

To these ends my invention consists, generally stated, in a removable hopper for use with machines of the character described comprising a rigid structure adapted to be supported within the ordinary hopper of the machine, and provided with transverse partitions so as to form a number of compartments into which the desired materials are fed.

In the drawings, Figure 1 is a top view of a cake making machine illustrating my invention as applied thereto. Fig. 2 is a transverse vertical section of the same on the line 2—2 Fig. 3; and Fig. 3 is a longitudinal vertical section of the same on the line 3—3, Fig. 2. Fig. 4 is a perspective view partly broken away illustrating the improved hopper of my invention; and Fig. 5 is a top view of a cake illustrating the character of the product.

The cake and cracker pressing and molding machine 1 illustrated is provided with the stationary hopper 2, and has below the same the drum 3 and rolls 4 and 5, which are driven at a regular rate through the gearing 6 from the pulley 7 illustrated. Below the passage 8 between the drum 3 and rolls 4, 5, is located the chamber 9, opening into the dies or nozzles 10, 11, 12 and 13. Below the nozzles 10, 11, 12 and 13 is located the severing wire 14 which is actuated from the carrier 15 to cut the strands of cake material passing through the nozzles 10, 11, etc., and deliver them to the moving table 16. I have described the particular machine illustrated in connection with my invention with some particularity, as this is necessary to an appreciation of the functions performed by the same, although it will be evident that my invention is adapted to use with other machines of the same general character.

In ordinary practice the material is fed in a mass into the hopper 2, and entering between the drum 3 and rolls 4, 5, it is pressed and worked into sheet form and delivered into the chamber 9. The material in the chamber 9 is forced by the oncoming material delivered from the rolls through the nozzles 10, 11 etc., and delivered in strands therefrom. It is cut into sections or pieces by the wire or cutter 14 and delivered in this shape upon the carrier 16 to be taken therefrom to the oven and made into the finished product. It is evident that in this operation, while the cakes or crackers can be formed at a high rate of speed, that they are necessarily all of an identical character. My invention is applicable where it is desired to form a product having two or more kinds of material such as the cake illustrated in Fig. 5, in which the part 18 is of white material and the part 19 is of dark color, such as chocolate flavored material. In order to quickly convert the machine to this use it is merely necessary to insert the removable hopper of my invention within the fixed hopper 2. The removable hopper 20 comprises the side walls 21, 22, the partitions 23, 24, 25 and 26, and also preferably the end walls 27 and 28. The side walls 21, 22 are constructed at an angle so as to fit flush within the side walls 2′, 2″ of the fixed hopper 2. The partitions 23, 24, etc., are provided at a distance apart equal to the mean distance between the nozzles 10, 11, etc., and are equal in number to the number of said nozzles. The end walls 27, 28 are preferably provided to fit flush against the end walls of the hopper 2, although they may be dispensed with entirely, if desired, the whole removable hopper being a rigid structure without the use of said end walls, The partitions 23, 24, etc., as well as the end walls 27, 28, if employed, are provided with the curved lower faces 30, 31 which are arranged to clear the corresponding curved faces of the drum 3 and roller 4 respectively.

In the use of my invention cake or cracker material of a varying nature is fed into the compartments 32, 33, 34, 35, and 36, formed by the partitions and end walls of the hopper. Thus the light colored material of the part 18 of the cake of Fig. 5 may be fed into the hopper 32, and the dark colored material of the part 19 may be put in the hopper 33, the light colored material in the hopper 34, the dark in the hopper 35, and the light in the hopper 36. The material is then drawn by the reducing or compacting rolls from the respective compartments 32, 33, etc., and fed into the chamber 9. As the nozzles 10, 11, etc., are located directly below and in line with the partitions 23, 24, etc., the material forced through said nozzles 10, 11, etc., will comprise partly one and partly the other feeding material. Thus the nozzle 10 will have fed into it on one side the light colored material from the compartment 32 and on the other side dark colored material from the compartment 33. This combined material will be delivered in strands or drops from the nozzles in the usual manner and cut up by the succeeding apparatus to form cakes of the desired character. It will be evident that any number of compartments may be employed so long as the number of partitions between the same corresponds to the number of nozzles in the machine to which my invention is applied. In fact my invention is applicable to machines of other types in which it is desired to combine different types of cake making material in any manner, the nozzle device being described as well adapted for use in combination with the divided hopper of my invention.

While I am aware that other means for accomplishing the object of my invention have been employed, such as the inserting of plates in grooves in a fixed hopper, the said plates fitting in grooves on the rollers below the same, I regard my device as a great improvement on such means, for the reason that the change in the use of the machine should be accomplished as quickly as possible, and my removable divided hopper can all be applied at once by simply inserting it bodily in the fixed hopper.

What I claim as new is:

1. A removable hopper for use with machines of the class described and provided with a fixed hopper and material delivering nozzles below the same, comprising a rigid structure adapted to fit within said fixed hopper and having partitions corresponding in number to and adapted to be arranged directly above said nozzles.

2. A removable hopper for use with machines of the character specified and provided with a fixed hopper and material delivering nozzles below the same, comprising side walls adapted to fit flush with the side walls of the fixed hopper and be supported thereby, and partitions connecting said side walls corresponding in number to and adapted to be arranged directly above said nozzles.

3. A removable hopper for use with machines of the character specified and provided with a fixed hopper and material delivering nozzles below the same, comprising side walls adapted to fit flush with the side walls of the fixed hopper and be supported thereby, and partitions connecting said side walls corresponding in number to and adapted to be arranged directly above said nozzles, said partitions having curved faces adapted to fit closely to the curved faces of the machine rolls.

In testimony whereof, I the said JOHN A. HOLMES have hereunto set my hand.

JOHN A. HOLMES.

Witnesses:
HERMAN N. WEILAND,
HENRY MCFARLANE.

---

Copies of this patent may be obtained for five cents each, by addressing the "Commissioner of Patents, Washington, D. C."